(12) United States Patent
Han et al.

(10) Patent No.: US 8,577,374 B2
(45) Date of Patent: Nov. 5, 2013

(54) METHOD AND DEVICE FOR SWITCHING BETWEEN BASE STATIONS

(75) Inventors: Xiaojiang Han, Shenzhen (CN); Hong Ding, Shenzhen (CN); Gang Zhao, Shenzhen (CN)

(73) Assignee: ZTE Corporation, Hi-Tech Industrial Park, Nanshan District, Shenzhen, Guangdong Province (CN)

( * ) Notice: Subject to any disclaimer, the term of this patent is extended or adjusted under 35 U.S.C. 154(b) by 65 days.

(21) Appl. No.: 13/379,334

(22) PCT Filed: Jun. 8, 2010

(86) PCT No.: PCT/CN2010/073679
§ 371 (c)(1),
(2), (4) Date: Dec. 19, 2011

(87) PCT Pub. No.: WO2010/145479
PCT Pub. Date: Dec. 23, 2010

(65) Prior Publication Data
US 2012/0100859 A1 Apr. 26, 2012

(30) Foreign Application Priority Data
Jun. 18, 2009 (CN) .......................... 2009 1 0150022

(51) Int. Cl.
*H04W 36/00* (2009.01)

(52) U.S. Cl.
USPC ............................ 455/436; 455/438; 455/437

(58) Field of Classification Search
USPC ........ 455/422.1, 436–444; 370/328, 331–334
See application file for complete search history.

(56) References Cited

U.S. PATENT DOCUMENTS 5,175,867 A * 12/1992 Wejke et al. .................. 455/439
7,593,732 B2 * 9/2009 Kim et al. ..................... 455/436
2002/0068568 A1 6/2002 Qing-An
2008/0085708 A1 * 4/2008 Kogure ......................... 455/436
2009/0316655 A1 * 12/2009 Prakash et al. ................ 370/331
2010/0214943 A1 * 8/2010 Immendorf et al. .......... 370/252
2012/0009971 A1 * 1/2012 Zhang et al. .................. 455/525
2012/0087338 A1 * 4/2012 Brandt et al. ................. 370/331

FOREIGN PATENT DOCUMENTS

| CN | 1234714 A | 11/1999 |
| CN | 1794865 A | 6/2006 |
| JP | 2007-129594 | 5/2007 |
| JP | 2007-536784 | 12/2007 |

OTHER PUBLICATIONS

Multiple Preparations of eNBs; published from Meeting #57bis; Sophia Antipolis, France, Oct. 8-11, 2007.

\* cited by examiner

*Primary Examiner* — Ajit Patel
(74) *Attorney, Agent, or Firm* — Nicholas A. Kees; Godfrey & Kahn, S.C.

(57) ABSTRACT

A method and apparatus for handover between base stations are disclosed. The method includes: a first base station sending handover request messages to neighboring base stations (401); the neighboring base stations judging whether to accept the handover according to information in the handover request messages, and sending judgment results to the first base station through request response messages (402); the first base station determining one destination base station from the neighboring base stations which are able to accept the handover, and sending a confirmation handover message to the destination base station (403); the destination base station allocating resources for a user equipment after receiving the confirmation handover message, and sending the allocated resources to the first base station through a confirmation handover response message (404); and the first base station indicating that the user equipment hands over to the destination base station after receiving the confirmation handover response message (405).

15 Claims, 4 Drawing Sheets

METHOD AND DEVICE FOR SWITCHING BETWEEN BASE STATIONS

TECHNICAL FIELD

The present invention relates to the communication field, and particularly, to a method and an apparatus for handover between base stations.

BACKGROUND OF THE RELATED ART

In the wireless communication system, the coverage range of each base station is basically fixed, but the user equipment (UE) generally is moving, thus, the UE often requires to hand over among a plurality of base stations so as to ensure the continuity of signals of the UE.

The handover process in the prior art is that: a source base station selects one destination base station which is able to carry out handover according to measurement results for neighboring base stations reported by the UE, and sends a handover request to the destination base station. The destination base station allocates resources for the UE according to the handover request, and returns a response message to the source base station. The source base station indicates the UE to carry out the handover after receiving the response message. In this process, if the load of the destination base station approaches saturation already and is unable to allocate the resources for the UE according to the handover request, then the source base station is required to re-select the destination base station, which delays the handover of the UE and reduces the handover efficiency.

In order to solve that problem, the prior art provides another handover process, which comprises: the source base station selecting a plurality of suitable base stations according to the measurement results for the neighboring base stations reported by the UE, and sending the handover requests to suitable base station. The suitable base stations allocate resources for the UE according to the handover requests, and return the response messages to the source base station. The source base station selects one destination base station from a plurality of suitable base stations according to the resource situations allocated for the UE by various suitable base stations, and commands the UE to hand over to the destination base station. Although that method improves the handover efficiency, all the suitable base stations have to allocate the resources for the UE, however, the UE is only able to hand over to one destination base station, and the resources allocated by other suitable base stations are all wasted, thereby affecting the load of the whole network.

SUMMARY OF THE INVENTION

The embodiments of the present invention provides a method and an apparatus for handover between base stations, which is used for implementing handover of the user equipment between the base stations and improving the load of the network.

A method for handover between base stations comprises:

a first base station sending handover request messages to neighboring base stations of the first base station;

the neighboring base stations judging whether to accept the handover according to information in the handover request messages, and sending judgment results to the first base station through request response messages;

the first base station determining one destination base station from the neighboring base stations which are able to accept the handover, and sending a confirmation handover message to the destination base station;

the destination base station allocating resources for a user equipment after receiving the confirmation handover message, and sending the allocated resources to the first base station through a confirmation handover response message; and the first base station indicating that the user equipment hands over to the destination base station after receiving the confirmation handover response message.

The step of the neighboring base stations sending judgment results to the first base station through request response messages comprises:

when the judgment result is accepting the handover, the neighboring base station sending an accepting handover reply instruction to the first base station; and when the judgment result is unable to accept the handover, the neighboring base station sending a refusing handover reply instruction to the first base station or doing no response.

The step of the first base station determining one destination base station from the neighboring base stations which are able to accept the handover comprises:

the first base station determining, from the neighboring base stations which are able to accept the handover, a neighboring base station which first sends the request response message of accepting the handover as the destination base station; or the first base station determining, from the neighboring base stations which are able to accept the handover, a neighboring base station of which a signal quality of the request response message is the best as the destination base station.

The step of the first base station determining, from the neighboring base stations which are able to accept the handover, a neighboring base station of which a signal quality of the request response message is the best as the destination base station comprises:

the first base station determining a request response message with the best signal quality and denoting accepting the handover from first n1 received request response messages, and taking the neighboring base station corresponding to the determined request response message as the destination base station, wherein n1 is a preset parameter value; or the first base station determining a request response message with the best signal quality from first n2 received request response messages which denote accepting the handover, and taking the neighboring base station corresponding to the determined request response message as the destination base station, wherein n2 is a preset parameter value.

The confirmation handover message comprises a user equipment identification.

The step of the neighboring base stations judging whether to accept the handover according to the handover request messages comprises:

one of the neighboring base stations judging whether a local load reaches a preset load threshold after receiving the handover request message, if the local load reaches the preset load threshold, refusing the handover, and if the local load does not reach the preset load threshold, accepting the handover;

one of the neighboring base stations judging whether services required by a user equipment are provided locally after receiving the handover request message, if the services required by the user equipment are provided locally, accepting the handover, and if the services required by the user equipment are not provided locally, refusing the handover;

one of the neighboring base stations judging whether local available resources satisfy requirements of a user equipment after receiving the handover request message, if the local available resources satisfy the requirements of the user equipment, accepting the handover, if the local available resources do not satisfy the requirements of the user equipment, refusing the handover; or one of the neighboring base stations judging whether a user equipment has abilities to work locally after receiving the handover request message, if the user equipment has the abilities to work locally, accepting the handover, if the user equipment has not the abilities to work locally, refusing the handover.

A base station comprises:

a base station interface module, which is configured to: send handover request messages to neighboring base stations, and receive request response messages comprising judgment results of whether to accept handover returned by the neighboring base stations;

a selection module, which is configured to: determine one destination base station from the neighboring base stations which are able to accept the handover, and send a confirmation handover message to the destination base station through the base station interface module; and a user interface module, which is configured to: send a handover indication message for indicating that a user equipment hands over to the destination base station to the user equipment after the base station interface module receives a confirmation handover response message comprising allocated resources.

The base station interface module is further configured to: receive the handover request message;

the base station further comprises:

a judgment module, which is configured to: judge whether to accept the handover according to the handover request message, and send the request response message to the base station sending the handover request message through the base station interface module; and an allocation module, which is configured to: allocating resources for the user equipment after the base station interface module receives the confirmation handover message, and sending the confirmation handover response message comprising the allocated resources to the base station sending the handover request message through the base station interface module.

The judgment module is configured to send the request response message to the base station sending the handover request message through the base station interface module in following ways:

when the judgment result is accepting the handover, sending an accepting handover reply instruction to the base station sending the handover request message through the base station interface module;

when the judgment result is unable to accept the handover, sending a refusing handover reply instruction to the base station sending the handover request message through the base station interface module or doing no response.

The selection module is configured to determine one destination base station from the neighboring base stations which are able to accept the handover in following ways:

determining, from the neighboring base stations which are able to accept the handover, a neighboring base station which first sends the request response message of accepting the handover as the destination base station; or determining, from the neighboring base stations which are able to accept the handover, a neighboring base station of which a signal quality of the request response message is the best as the destination base station.

The selection module is configured to determine, from the neighboring base stations which are able to accept the handover, a neighboring base station of which a signal quality of the request response message is the best as the destination base station in following ways:

determining a request response message with the best signal quality and denoting accepting the handover from first n1 received request response messages, and taking the neighboring base station corresponding to the determined request response message as the destination base station, wherein n1 is a preset parameter value; or determining a request response message with the best signal quality from first n2 received request response messages which denote accepting the handover, and taking the neighboring base station corresponding to the determined request response message as the destination base station, wherein n2 is a preset parameter value.

A base station comprises:

a base station interface module, which is configured to: receive a handover request message;

a judgment module, which is configured to: judge whether to accept the handover according to information in the handover request message, and send a request response message to a base station which sends the handover request message through the base station interface module; and an allocation module, which is configured to: allocate resources for a user equipment after the base station interface module receives the confirmation handover message, and send a confirmation handover response message comprising the allocated resources to the base station which sends the handover request message through the base station interface module.

In the present invention, various neighboring base stations are only required to judge whether to accept the handover instead of allocating the resources at this time. The source base station determines one destination base station from the neighboring base stations which are able to accept the handover, and that destination base station allocates the resources for the UE, which not only ensures the handover efficiency, but also saves the resources of the neighboring base stations except the destination base station, thereby improving the load capability of the whole network system.

PREFERRED EMBODIMENTS OF THE PRESENT INVENTION

In the embodiments of the present invention, after the first base station sends the handover request messages to neighboring base stations, each neighboring base station is only required to reply whether to accept the handover instead of allocating resources for the UE at this time. The first base station determines one base station from the neighboring base stations which are able to accept the handover as the destination base station, and that destination base station allocates the resources for the UE. The first base station indicates that the UE hands over to the destination base station. Since the first base station is to select the destination base station from the neighboring base stations which denote being able to accept the handover, thus that destination base station basically is able to bear the UE after the handover, which ensures the handover efficiency. Besides, only the destination base station allocates the resources for the UE, other neighboring base stations are not required to allocate the resources for the UE, thereby saving this part of resources, and improving the loads of other neighboring base stations and the whole network.

Figure 1:
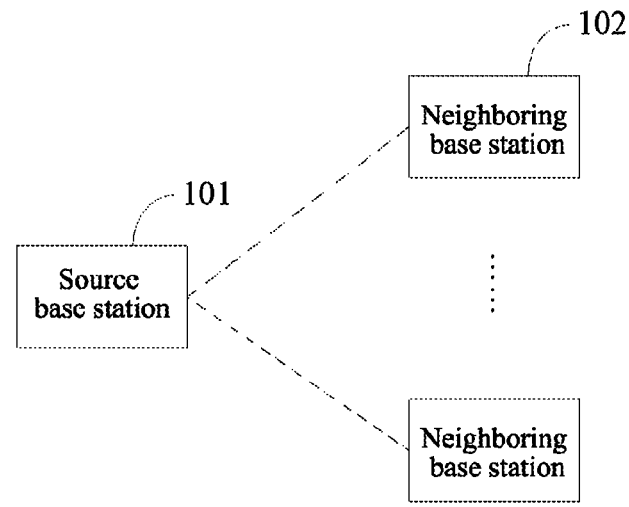
FIG. 1 is a structure diagram of a network system according to an embodiment of the present invention.

With reference to FIG. 1, a network system in the present embodiment comprises a source base station (i.e., the first base station) 101 and neighboring base stations 102 of the source base station, wherein the source base station 101 is relative to the UE which is required to carry out the handover. One source base station 101 can have a plurality of neighboring base stations 102.

The source base station 101 is used for sending handover request messages to the neighboring base stations 102, and receiving request response messages including judgment results whether to accept the handover returned by the neighboring base stations 102; determining one destination base station from the neighboring base stations 102 which are able to accept the handover, and sending a confirmation handover message to the destination base station; and after receiving the confirmation handover response message including the allocated resources, sending the handover indication message to the user equipment for indicating that the user equipment hands over to the destination base station.

The neighboring base station 102 is used for receiving the handover request message; judging whether to accept the handover according to the information in the handover request message, and sending the request response message to the source base station 101; after receiving the confirmation handover message, allocating the resources for the user equipment, and sending the confirmation handover response message including the allocated resources to the source base station 101.

The base station in the embodiment can be the Node B or the Evolved Node B (eNB) and so on.

Figure 2:
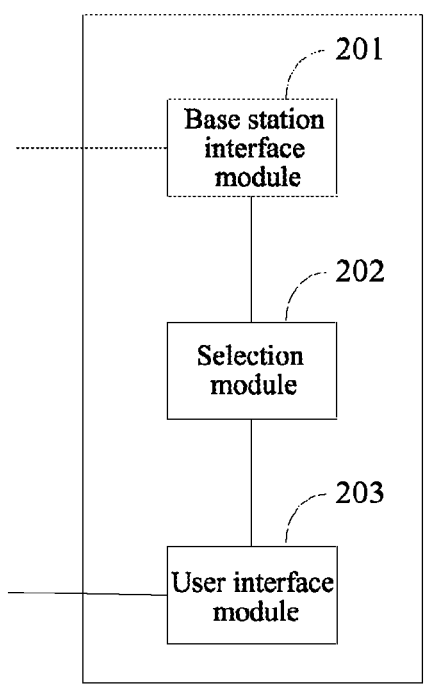
FIG. 2 is a structure diagram of a source base station according to an embodiment of the present invention.

In the system, the source base station 101 comprises a base station interface module 201, a selection module 202 and a user interface module 203, as shown in FIG. 2.

The base station interface module 201 is used for sending the handover request messages to the neighboring base stations 102, and receiving the request response messages including the judgment results whether to accept the handover returned by the neighboring base stations 102, wherein the handover request message includes information such as source cell information, UE (which is required to carry out the handover) identification and services which are being transmitted by the UE, and so on.

The selection module 202 is used for determining one destination base station from the neighboring base stations 102 which are able to accept the handover, generating the confirmation handover message, and sending the confirmation handover message to the destination base station through the base station interface module 201. The confirmation handover message includes the UE identification and so on.

The selection module 202 can determine, from the neighboring base stations which are able to accept the handover, the neighboring base station which first sends the request response message of accepting the handover as the destination base station; or determine, from the neighboring base stations which are able to accept the handover, the neighboring base station of which the signal quality of the request response message is the best as the destination base station. There also is a plurality of implementation ways of the selection module 202 selecting the neighboring base station with the best signal quality, for example, the neighboring base station of which the signal quality of the request response message is the best is determined as the destination base station from all of the neighboring base stations which are able to accept the handover; or, the request response message which has the best signal quality and denotes accepting the handover is determined from the first n1 received request response messages, and the neighboring base station corresponding to the determined request response message acts as the destination base station, wherein n1 is a preset parameter value; or, the request response message with the best signal quality is determined from the first n2 received request response messages which denote accepting the handover, and the neighboring base station corresponding to the determined request response message acts as the destination base station, wherein n2 is a preset parameter value. If the selection module 202 determines the destination base station according to the request response message with the best signal quality, then the source base station 101 further includes a measurement module, which is not shown in the figure, and is used for measuring the request response messages sent by the neighboring base stations 102 to obtain the signal qualities.

The user interface module 203 is used for generating and sending a handover indication message for indicating that the user equipment hands over to the destination base station to the user equipment after the base station interface module 201 receives the confirmation handover response message including the allocated resources.

Figure 3:
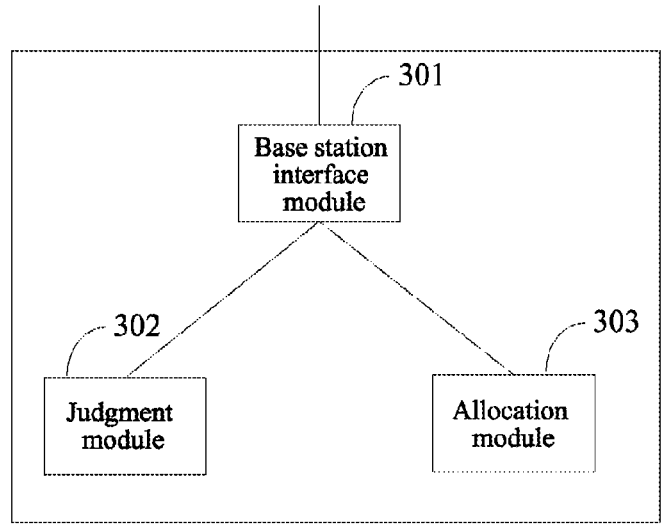
FIG. 3 is a structure diagram of a neighboring base station according to an embodiment of the present invention.

The neighboring base station 102 comprises: a base station interface module 301, a judgment module 302 and an allocation module 303, as shown in FIG. 3.

The base station interface module 301 is used for receiving the handover request message.

The judgment module 302 is used for judging whether to accept the handover according to the information in the handover request message, and generating and sending the request response message to the source base station 101 through the base station interface module 301, wherein, when the judgment result is that the handover is accepted, the request response message sent by the base station interface module 301 is an accepting handover reply instruction (ACK); when the judgment result is that the handover is refused, the request response message sent by the base station interface module 301 is a refusing handover reply instruction (NACK) or no responding. Specifically, there is a plurality of ways of the judgment module 302 judging whether to accept the handover, for example, judging whether the local load reaches a preset load threshold, if yes, then the handover is refused, otherwise, the handover is accepted; and/or, judging whether the local place is responsible for transmitting the services of the UE according to the information in the handover request message, and if yes, then the handover is accepted, otherwise, the handover is refused; and/or judging whether the local available resources satisfy the service requirement of the UE, if satisfying, then the handover is accepted, otherwise, the handover is refused; and/or judging whether the UE has the abilities of working locally, if yes, the handover is accepted, otherwise, the handover is refused. The judgment module 302 can further judge whether to accept the handover according to other conditions, and herein it will not be enumerated one by one, and all the conditions for the handover judgment are all suitable for the embodiment.

The allocation module 303 is used for allocating the resources for the user equipment after the base station interface module 301 receives the confirmation handover message, generating and sending the confirmation handover response message including the allocated resources to the source base station 101 through the base station interface module 301. Specifically, if the confirmation handover message includes identification information such as the source cell identification and the UE identification and so on, then the judgment module 302 is required to temporarily store the information in the handover request message, and the allocation module 303 allocates the resources for the UE according to the information related to the service of the UE or the required resources temporarily stored in the judgment module 302. If the confirmation handover message further includes the information related to the required resources, such as the service of the UE and so on, then the judgment module 302 does not temporarily store the information in the handover request message, and the allocation module 303 can allocate the resources for the UE according to the information in the confirmation handover message.

The source base station 101 and the neighboring base station 102 in the embodiment can be the same base station, which include all the functions of each other, but only play different roles in different scenarios.

The above description is the illustration of the functions and structure of the network system and the base stations, the handover between the base stations is understood in a certain degree, and below the handover process between the base stations will be described in detail by method flows.

Figure 4:
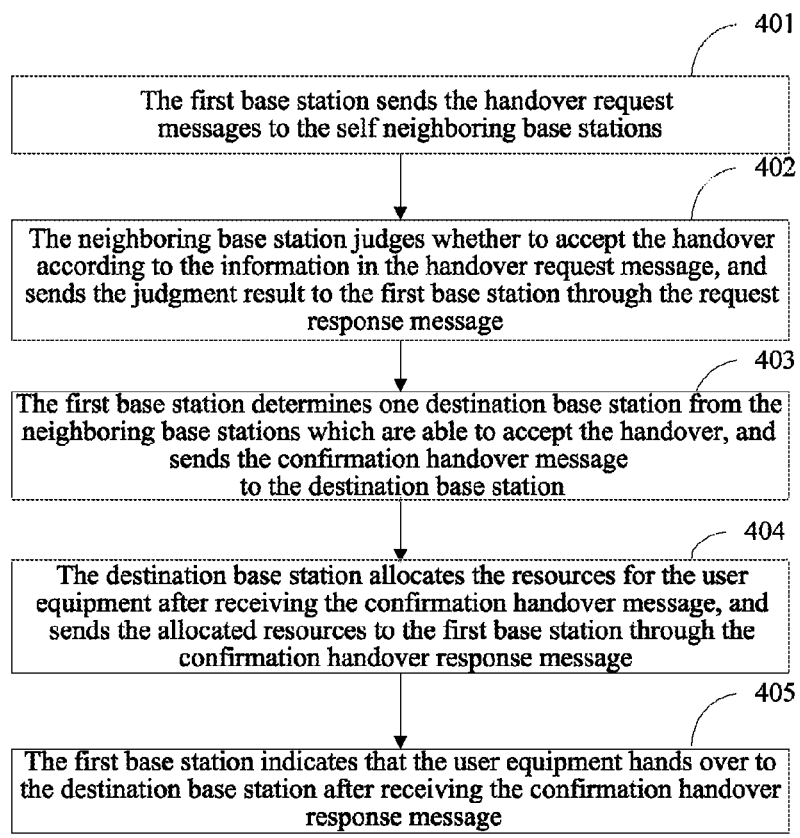
FIG. 4 is a flow chart of a main method for handover between base stations according to an embodiment of the present invention.

With reference to FIG. 4, the main method flow of the handover between the base stations in the embodiment is as follows:

step 401, the first base station sends the handover request messages to the self neighboring base stations.

Step 402, the neighboring base station judges whether to accept the handover according to the information in the handover request message, and sends the judgment result to the first base station through the request response message.

Step 403, the first base station determines one destination base station from the neighboring base stations which are able to accept the handover, and sends the confirmation handover message to the destination base station.

Step 404, the destination base station allocates the resources for the user equipment after receiving the confirmation handover message, and sends the allocated resources to the first base station through the confirmation handover response message.

Step 405, the first base station indicates that the user equipment hands over to the destination base station after receiving the confirmation handover response message.

Since there is a plurality of specific implementation ways of step 403 and so on, below it will be described by two embodiments in detail.

Figure 5:
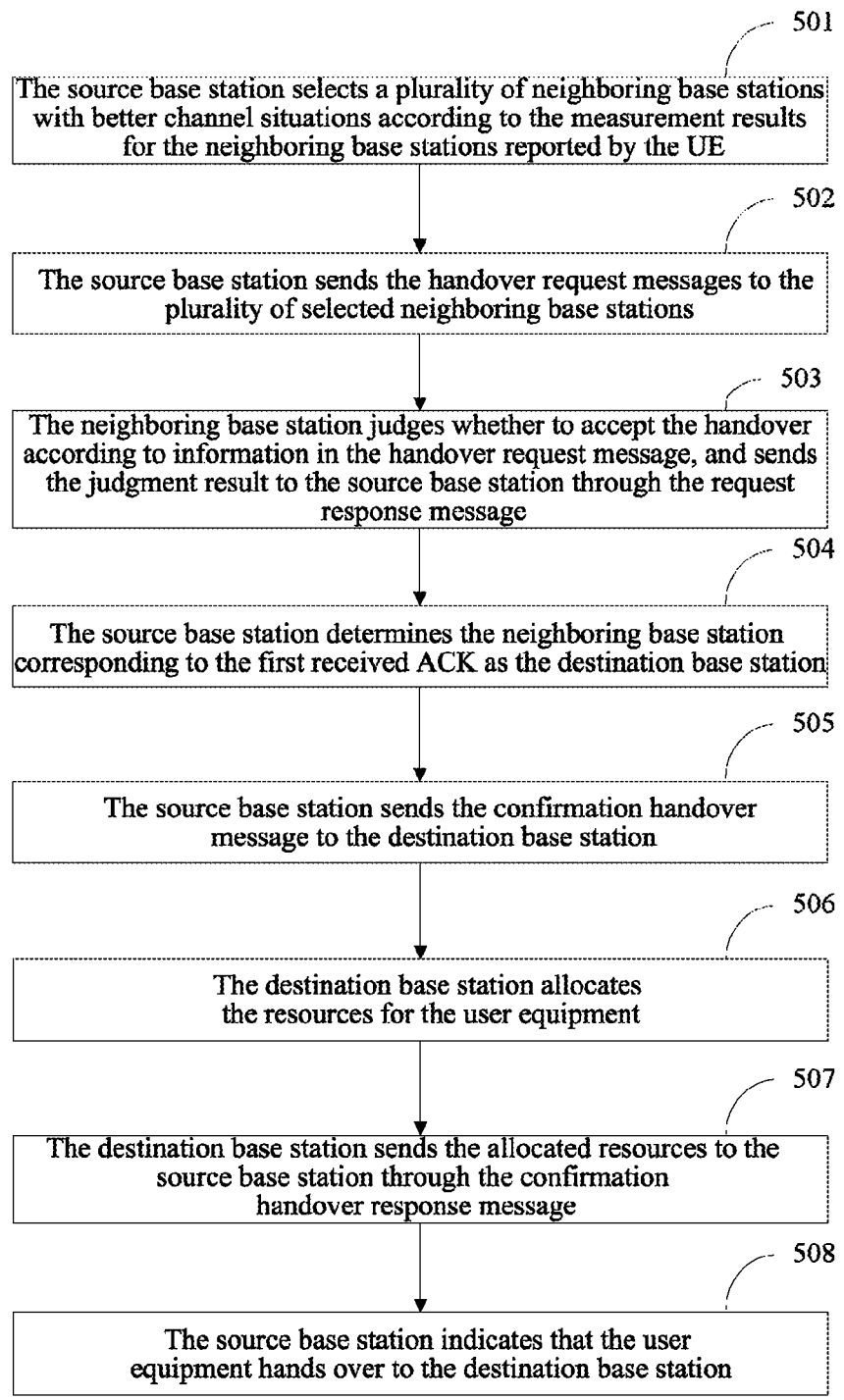
FIG. 5 is a flow chart of a method for handover when a source base station determines a destination base station based on a first received confirmation handover response message which accepts the handover according to an embodiment of the present invention.

With reference to FIG. 5, the flow of the method for handover when the source base station determines the destination base station according to the first received confirmation handover response message of accepting the handover in the embodiment is as follows:

step 501, the source base station selects a plurality of neighboring base stations with better channel situations according to the measurement result for the neighboring base stations reported by the UE. The number of the plurality of neighboring base stations can be set in advance, that is, the first M neighboring base stations are selected according to the channel situations from good to bad.

Step 502, the source base station sends the handover request messages to the plurality of selected neighboring base stations.

Step 503, the neighboring base station judges whether to accept the handover according to the information in the handover request message, and sends the judgment result to the source base station through the request response message. The request response message is the ACK or the NACK.

Step 504, the source base station determines the neighboring base station corresponding to the first received ACK as the destination base station, wherein the neighboring base station corresponding to the first received ACK and the neighboring base station which first sends the ACK are generally the same neighboring base station.

Step 505, the source base station sends the confirmation handover message to the destination base station.

Step 506, the destination base station allocates the resources for the user equipment.

Step 507, the destination base station sends the allocated resources to the source base station through the confirmation handover response message.

Step 508, the source base station indicates that the user equipment hands over to the destination base station.

Figure 6:
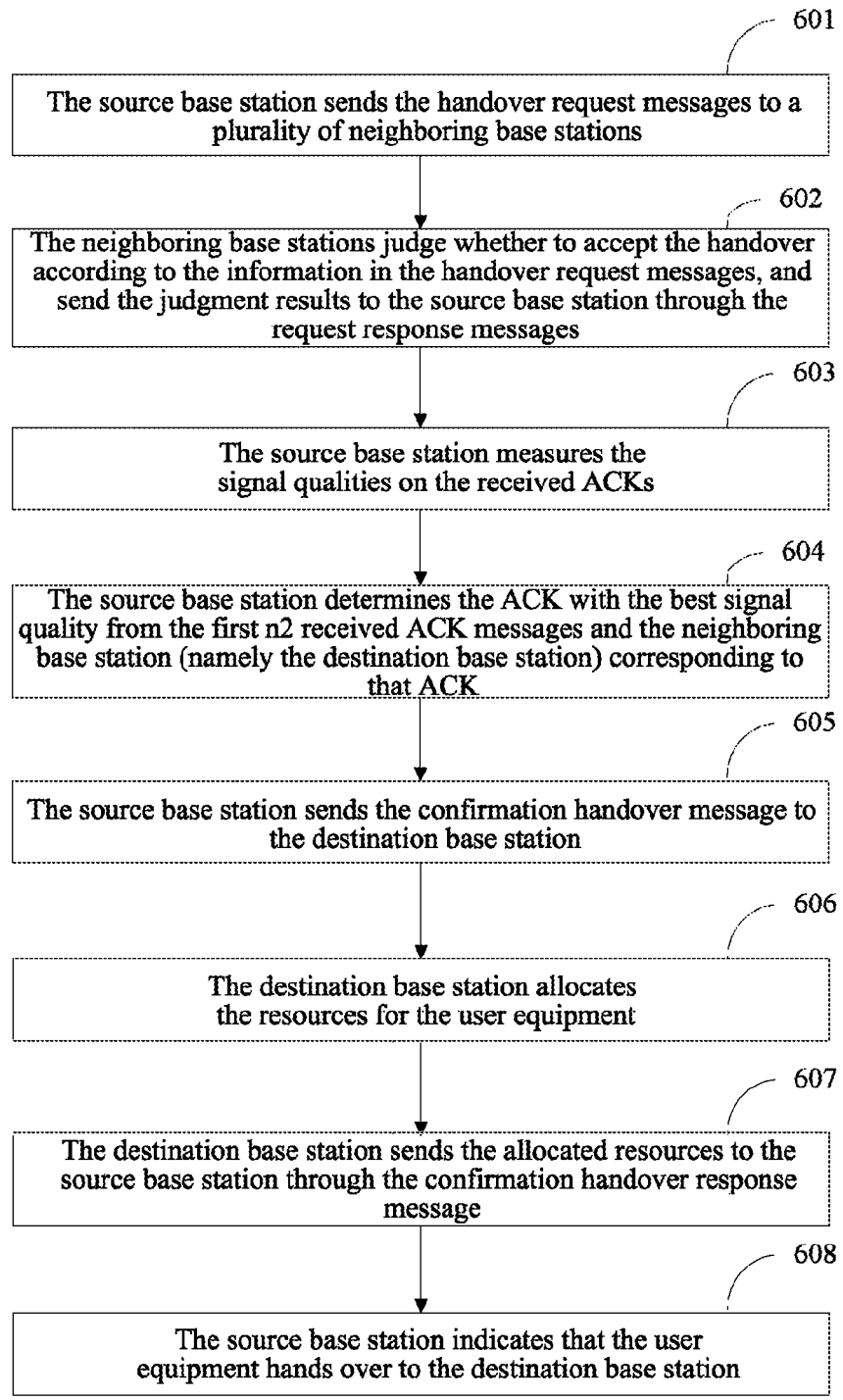
FIG. 6 is a flow chart of a method for handover when a source base station determines a destination base station based on a confirmation handover response message with the best signal quality according to an embodiment of the present invention.

With reference to FIG. 6, the flow of the method for handover when the source base station determines the destination base station according to the confirmation handover response message with the best signal quality in the embodiment is as follows:

step 601, the source base station sends the handover request messages to a plurality of neighboring base stations.

Step 602, the neighboring base stations judge whether to accept the handover according to information in the handover request messages, and send the judgment results to the source base station through the request response messages.

Step 603, the source base station measures the signal qualities on the received ACKs.

Step 604, the source base station determines the ACK with the best signal quality from the first n2 received ACK messages and the neighboring base station (namely the destination base station) corresponding to that ACK.

Step 605, the source base station sends the confirmation handover message to the destination base station.

Step 606, the destination base station allocates the resources for the user equipment.

Step 607, the destination base station sends the allocated resources to the source base station through the confirmation handover response message.

Step 608, the source base station indicates that the user equipment hands over to the destination base station.

The software for implementing the embodiments of the present invention can be stored in a storage medium, such as a floppy disk, a hardware disk, an optical disk and a flash, and so on.

In the embodiments of the present invention, various neighboring base stations are only required to judge whether to accept the handover instead of allocating the resources at this time. The source base station determines one destination base station from the neighboring base stations which are able to accept the handover, and that destination base station allocates the resources for the UE, which not only ensures the handover efficiency, but also saves the resources of the neighboring base stations except the destination base station, thereby improving the load capability of the whole network system. The embodiments of the present invention further provides a plurality of ways of determining the destination base station, especially selecting the destination base station with the best signal quality, which further improves the handover efficiency.

Obviously, various modifications and variations can be made to the present invention by those having ordinary skills in the art without departing from the spirit or scope of the present invention. Thus, if such modifications and variations made to the present invention belong to the scope of the appended claims of the present invention and the equivalent techniques thereof, then the present invention also intends to include these modifications and variations.

The person having ordinary skills in the art could understand that all or part of steps in the above method examples can be implemented by programs instructing the related hardware, and the programs can be stored in a computer readable storage medium, such as a read-only memory, a magnetic disk, or an optical disk, and so on. Optionally, all or part of the steps in the above embodiments can be implemented with one or more integrated circuits. Accordingly, each module/unit in the above embodiments can be implemented in the form of hardware, or in the form of software function module. The present invention is not limited to any specific form of the combination of the hardware and software.

INDUSTRIAL APPLICABILITY

The present invention not only ensures the handover efficiency, but also saves the resources of the neighboring base stations except the destination base station, thereby improving the load capability of the whole network system.

What is claimed is:

1. A method for handover between base stations, comprising following steps:
   a first base station sending handover request messages to neighboring base stations of the first base station;
   said neighboring base stations judging whether to accept the handover according to said handover request messages, and sending judgment results to said first base station through request response messages;
   said first base station determining one destination base station from the neighboring base stations which are able to accept the handover, and sending a confirmation handover message to said destination base station;
   said destination base station allocating resources for a user equipment after receiving said confirmation handover message, and sending the allocated resources to said first base station through a confirmation handover response message; and
   said first base station indicating that said user equipment hands over to said destination base station after receiving said confirmation handover response message;
   wherein the step of said neighboring base stations judging whether to accept the handover according to said handover request messages comprises:
   one of said neighboring base stations judging whether a local load reaches a preset load threshold after receiving said handover request message, if the local load reaches the preset load threshold, refusing the handover, and if the local load does not reach the preset load threshold, accepting the handover;
   one of said neighboring base stations judging whether services required by a user equipment are provided locally after receiving said handover request message, if the services required by the user equipment are provided locally, accepting the handover, and if the services required by the user equipment are not provided locally, refusing the handover;
   one of said neighboring base stations judging whether local available resources satisfy requirements of a user equipment after receiving said handover request message, if the local available resources satisfy the requirements of the user equipment, accepting the handover, if the local available resources do not satisfy the requirements of the user equipment, refusing the handover; or
   one of said neighboring base stations judging whether a user equipment has abilities to work locally after receiving said handover request message, if the user equipment has the abilities to work locally, accepting the handover, if the user equipment has not the abilities to work locally, refusing the handover.

2. The method as claimed in claim 1, wherein the step of said neighboring base stations sending judgment results to said first base station through request response messages comprises:
   when the judgment result is accepting the handover, the neighboring base station sending an accepting handover reply instruction to the first base station; and
   when the judgment result is unable to accept the handover, the neighboring base station sending a refusing handover reply instruction to the first base station or doing no response.

3. The method as claimed in claim 1, wherein the step of said first base station determining one destination base station from the neighboring base stations which are able to accept the handover comprises:
   said first base station determining, from the neighboring base stations which are able to accept the handover, a neighboring base station which first sends the request response message of accepting the handover as the destination base station; or
   said first base station determining, from the neighboring base stations which are able to accept the handover, a neighboring base station of which a signal quality of the request response message is the best as the destination base station.

4. The method as claimed in claim 3, wherein the step of said first base station determining, from the neighboring base stations which are able to accept the handover, a neighboring base station of which a signal quality of the request response message is the best as the destination base station comprises:
   said first base station determining a request response message with the best signal quality and denoting accepting the handover from first n1 received request response messages, and taking the neighboring base station corresponding to the determined request response message as the destination base station, wherein n1 is a preset parameter value; or
   said first base station determining a request response message with the best signal quality from first n2 received request response messages which denote accepting the handover, and taking the neighboring base station corresponding to the determined request response message as the destination base station, wherein n2 is a preset parameter value.

5. The method as claimed in claim 1, wherein said confirmation handover message comprises a user equipment identification.

6. The method as claimed in claim 2, wherein the step of said first base station determining one destination base station from the neighboring base stations which are able to accept the handover comprises:

said first base station determining, from the neighboring base stations which are able to accept the handover, a neighboring base station which first sends the request response message of accepting the handover as the destination base station; or said first base station determining, from the neighboring base stations which are able to accept the handover, a neighboring base station of which a signal quality of the request response message is the best as the destination base station.

7. The method as claimed in claim 6, wherein the step of said first base station determining, from the neighboring base stations which are able to accept the handover, a neighboring base station of which a signal quality of the request response message is the best as the destination base station comprises:

said first base station determining a request response message with the best signal quality and denoting accepting the handover from first n1 received request response messages, and taking the neighboring base station corresponding to the determined request response message as the destination base station, wherein n1 is a preset parameter value; or said first base station determining a request response message with the best signal quality from first n2 received request response messages which denote accepting the handover, and taking the neighboring base station corresponding to the determined request response message as the destination base station, wherein n2 is a preset parameter value.

8. A base station, comprising:

a base station interface module, which is configured to send first handover request messages to neighboring base stations, and receive request response messages comprising judgment results of whether to accept handover returned by the neighboring base stations;

a selection module, which is configured to determine one destination base station from the neighboring base stations which are able to accept the handover, and send a confirmation handover message to said destination base station through the base station interface module; and a user interface module, which is configured to send a handover indication message for indicating that a user equipment hands over to the destination base station to the user equipment after said base station interface module receives a confirmation handover response message comprising allocated resources;

wherein said selection module is configured to determine one destination base station from the neighboring base stations which are able to accept the handover in following ways:

determining, from the neighboring base stations which are able to accept the handover, a neighboring base station which first sends the request response message of accepting the handover as the destination base station; or determining, from the neighboring base stations which are able to accept the handover, a neighboring base station of which a signal quality of the request response message is the best as the destination base station;

wherein said selection module is configured to determine, from the neighboring base stations which are able to accept the handover, a neighboring base station of which a signal quality of the request response message is the best as the destination base station in following ways:

determining a request response message with the best signal quality and denoting accepting the handover from first n1 received request response messages, and taking the neighboring base station corresponding to the determined request response message as the neighboring base station, wherein n1 is a preset parameter value; or determining a request response message with the best signal quality from first n2 received request response messages which denote accepting the handover, and taking the neighboring base station corresponding to the determined request response message as the neighboring base station, wherein n2 is a preset parameter value.

9. The base station as claimed in claim 8, wherein, said base station interface module is further configured to: receive a second handover request message;

said base station further comprises:

a judgment module, which is configured to: judge whether to accept the handover according to the handover request message, and send the request response message to the base station sending the handover request message through said base station interface module; and an allocation module, which is configured to: allocating resources for the user equipment after said base station interface module receives the confirmation handover message, and sending the confirmation handover response message comprising the allocated resources to the base station sending the handover request message through the base station interface module.

10. The base station as claimed in claim 9, wherein said judgment module is configured to send the request response message to the base station sending the handover request message through said base station interface module in following ways:

when the judgment result is accepting the handover, sending an accepting handover reply instruction to the base station sending the handover request message through said base station interface module;

when the judgment result is unable to accept the handover, sending a refusing handover reply instruction to the base station sending the handover request message through said base station interface module or doing no response.

11. The base station as claimed in claim 9, wherein said selection module is configured to determine one destination base station from the neighboring base stations which are able to accept the handover in following ways:

determining, from the neighboring base stations which are able to accept the handover, a neighboring base station which first sends the request response message of accepting the handover as the destination base station; or determining, from the neighboring base stations which are able to accept the handover, a neighboring base station of which a signal quality of the request response message is the best as the destination base station.

12. The base station as claimed in claim 11, wherein said selection module is configured to determine, from the neighboring base stations which are able to accept the handover, a neighboring base station of which a signal quality of the request response message is the best as the destination base station in following ways:

determining a request response message with the best signal quality and denoting accepting the handover from first n1 received request response messages, and taking the neighboring base station corresponding to the determined request response message as the neighboring base station, wherein n1 is a preset parameter value; or determining a request response message with the best signal quality from first n2 received request response messages which denote accepting the handover, and taking the neighboring base station corresponding to the determined request response message as the neighboring base station, wherein n2 is a preset parameter value.

13. The base station as claimed in claim 10, wherein said selection module is configured to determine one destination base station from the neighboring base stations which are able to accept the handover in following ways:
   determining, from the neighboring base stations which are able to accept the handover, a neighboring base station which first sends the request response message of accepting the handover as the destination base station; or
   determining, from the neighboring base stations which are able to accept the handover, a neighboring base station of which a signal quality of the request response message is the best as the destination base station.

14. The base station as claimed in claim 13, wherein said selection module is configured to determine, from the neighboring base stations which are able to accept the handover, a neighboring base station of which a signal quality of the request response message is the best as the destination base station in following ways:
   determining a request response message with the best signal quality and denoting accepting the handover from first n1 received request response messages, and taking the neighboring base station corresponding to the determined request response message as the neighboring base station, wherein n1 is a preset parameter value; or
   determining a request response message with the best signal quality from first n2 received request response messages which denote accepting the handover, and taking the neighboring base station corresponding to the determined request response message as the neighboring base station, wherein n2 is a preset parameter value.

15. A base station, comprising:
a base station interface module, which is configured to: receive a handover request message;
a judgment module, which is configured to: judge whether to accept the handover according to information in the handover request message, and send a request response message to a base station which sends the handover request message through the base station interface module; and
an allocation module, which is configured to: allocate resources for a user equipment after the base station interface module receives the confirmation handover message, and send a confirmation handover response message comprising the allocated resources to the base station which sends the handover request message through the base station interface module;
wherein said judgment module judging whether to accept the handover according to information in the handover request message refer to:
judging whether a local load reaches a preset load threshold, if the local load reaches the preset load threshold, refusing the handover, and if the local load does not reach the preset load threshold, accepting the handover;
judging whether services required by a user equipment are provided locally, if the services required by the user equipment are provided locally, accepting the handover, and if the services required by the user equipment are not provided locally, refusing the handover;
judging whether local available resources satisfy requirements of a user equipment, if the local available resources satisfy the requirements of the user equipment, accepting the handover, if the local available resources do not satisfy the requirements of the user equipment, refusing the handover; or
judging whether a user equipment has abilities to work locally, if the user equipment has the abilities to work locally, accepting the handover, if the user equipment has not the abilities to work locally, refusing the handover.

* * * * *